United States Patent [19]
Zagorac

[11] Patent Number: 5,263,345
[45] Date of Patent: Nov. 23, 1993

[54] ANTI-THEFT DEVICE FOR A MOTOR VEHICLE

[76] Inventor: Nikola Zagorac, #1907, 9717-111 Street, Edmonton, Alberta, Canada, T5K 2M6

[21] Appl. No.: 950,003
[22] Filed: Sep. 24, 1992
[51] Int. Cl.⁵ .............................................. F16H 57/00
[52] U.S. Cl. ...................................... 70/201; 70/245; 70/254
[58] Field of Search ..................... 70/192-202, 70/204, 206, 237, 238, 245-247, 254

[56] References Cited

U.S. PATENT DOCUMENTS

| | | | |
|---|---|---|---|
| 1,272,072 | 7/1918 | Madsen | 70/199 |
| 1,402,555 | 1/1922 | Whitehurst et al. | 70/200 |
| 1,448,983 | 3/1923 | Wekerle | 70/254 X |
| 1,560,582 | 11/1925 | Kagarise | 70/202 |
| 1,566,885 | 12/1925 | Laska | 70/200 |
| 4,858,451 | 8/1989 | Balina et al. | 70/202 |
| 4,912,952 | 4/1990 | Magrobi | 70/199 |
| 4,938,042 | 7/1990 | Muramatsu | 70/245 |

FOREIGN PATENT DOCUMENTS

| | | | |
|---|---|---|---|
| 29883 | 7/1922 | Denmark | 70/199 |
| 3103658 | 9/1982 | Fed. Rep. of Germany | 70/192 |
| 602468 | 3/1926 | France | 70/199 |
| 458096 | 6/1950 | Italy | 70/202 |

*Primary Examiner*—Peter M. Cuomo
*Assistant Examiner*—Suzanne L. Dino
*Attorney, Agent, or Firm*—Michael I. Kroll

[57] ABSTRACT

An improved anti-theft device is provided for a motor vehicle having a floor, a central console on the floor, an emergency brake lever on the central console, a cable extending from the emergency brake lever to operate the emergency brake and control pedals above the floor. The device consists of a structure coupled between the emergency brake lever and the control pedals for preventing operation of the control pedals when the emergency brake lever is pulled into its engagement position to set the emergency brake in the motor vehicle.

11 Claims, 2 Drawing Sheets

ANTI-THEFT DEVICE FOR A MOTOR VEHICLE

BACKGROUND OF THE INVENTION

1. Field of the Invention

The instant invention relates generally to automobile locking apparatuses and more specifically it relates to an improved anti-theft device for a motor vehicle.

2. Description of the Prior Art

Numerous automobile locking apparatuses have been provided in prior art that are adapted to prevent unauthorized persons from illegally driving automobiles equipped with the automobile locking apparatuses. While these units may be suitable for the particular purpose to which they address, they would not be as suitable for the purposes of the present invention as heretofore described.

SUMMARY OF THE INVENTION

A primary object of the present invention is to provide an improved anti-theft device for a motor vehicle that will overcome the shortcomings of the prior art devices.

Another object is to provide an improved anti-theft device for a motor vehicle that is coupled between the emergency brake lever and the control pedals of the motor vehicle, so that when the emergency brake lever is activated, access to the control pedals will be prevented.

An additional object is to provide an improved anti-theft device for a motor vehicle in which the emergency brake lever contains a numerical code lock to prohibit release of the emergency brake lever and access to the control pedals, so that an unauthorized person cannot drive the motor vehicle.

A further object is to provide an improved anti-theft device for a motor vehicle that is simple and easy to use.

A still further object is to provide an improved anti-theft device for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
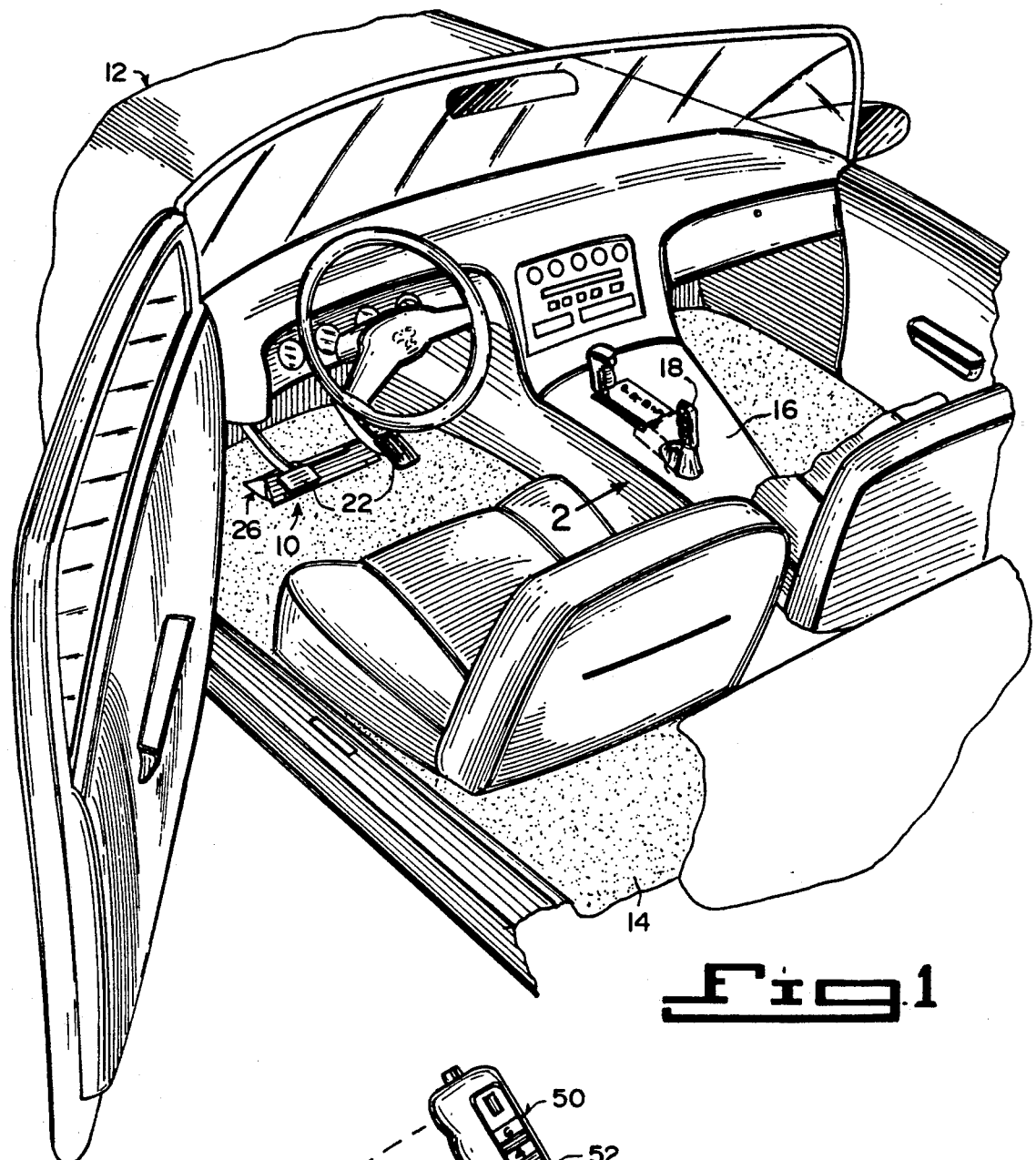
FIG. 1 is a front perspective view of a forward portions of a motor vehicle showing the instant invention installed therein.
Figure 2:
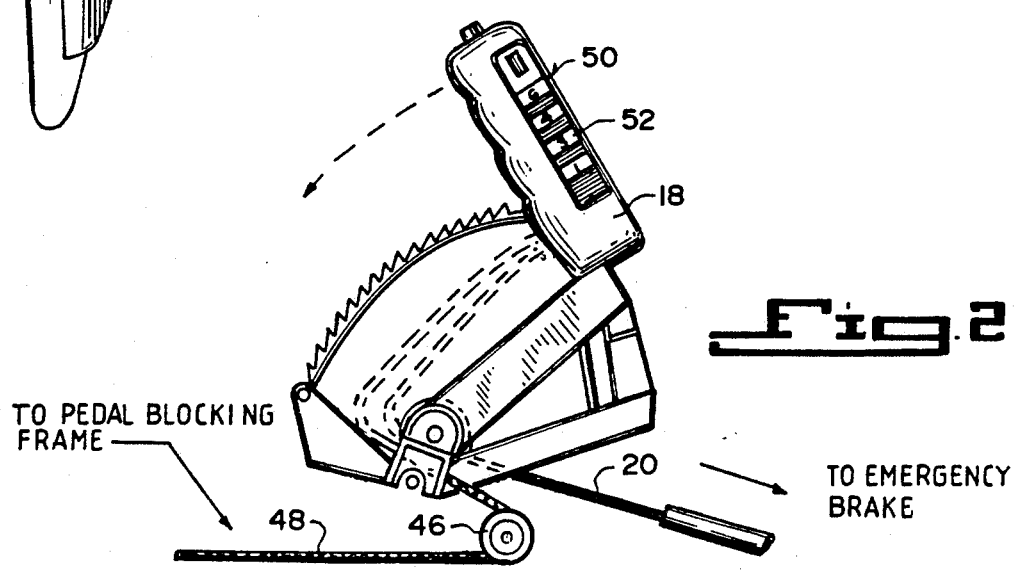
FIG. 2 is a side view with parts broken away taken in direction of arrow 2 in FIG. 1, showing the modified emergency brake lever and cooperating parts in greater detail.
Figure 3:
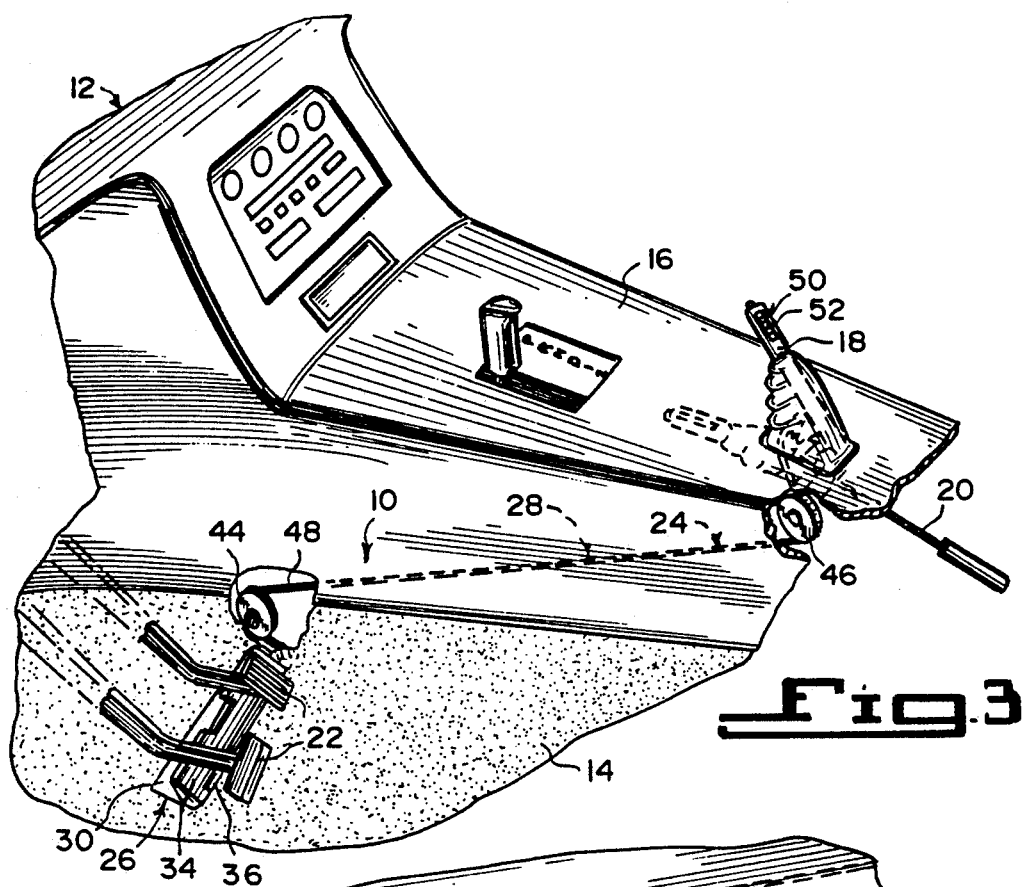
FIG. 3 is a front perspective view of the instant invention and portions of the surrounding structures of the motor vehicle broken away.
Figure 4:
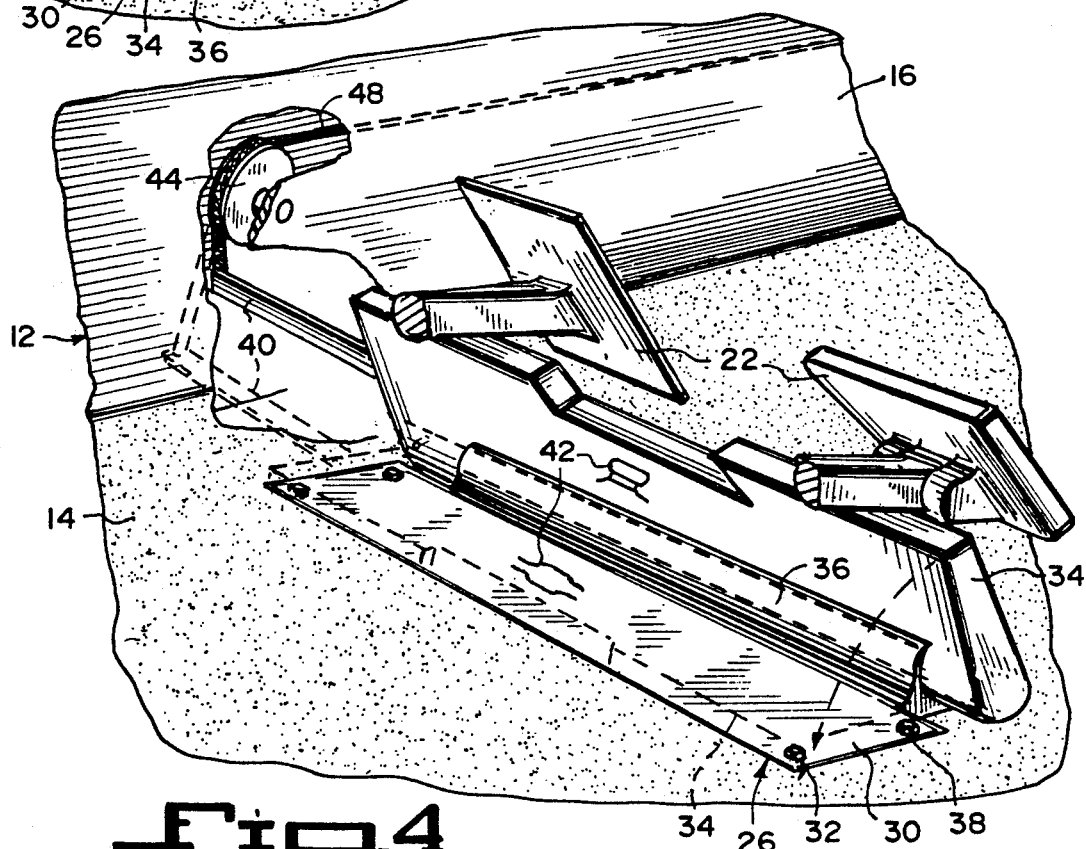
FIG. 4 is an enlarged rear perspective view of the immobilizing bracket and cooperating parts with portions of the surrounding structures of the motor vehicle broken away.

Turning now descriptively to the drawings, in which similar reference characters denote similar elements throughout the several views, the Figures illustrate an improved anti-theft device 10 for a motor vehicle 12 having a floor 14, a central console 16 on the floor 14, an emergency brake lever 18 on the central console 16, a cable 20 extending from the emergency brake lever 18 to operate the emergency brake and control pedals 22 above the floor 14. The device 10 consists of a structure 24 coupled between the emergency brake lever 18 and the control pedals 22 for preventing operation of the control pedals 22, when the emergency brake lever 18 is pulled into its engagement position to set the emergency brake in the motor vehicle 12.

The control pedals operation preventing structure 24 includes an immobilizing bracket 26 on the floor 14 under the control pedals 22 adjacent to one side of the central console 16 in the motor vehicle 12. A linkage mechanism 28 is connected to one side of the immobilizing bracket 26 and extends within the central console 16 to the emergency brake lever 18. When the emergency brake lever 18 is pulled into its engagement position, the linkage mechanism 28 will cause the immobilizing bracket 26 to contact the control pedals 22, preventing the control pedals 22 from operating.

The immobilizing bracket 26 consists of a base plate 30, fasteners 32 for fastening the base plate 30 to the floor 14 under the control pedals 22 in the motor vehicle 12, a blocking plate 34 and a hinge 36 located between a forward edge of the base plate 30 and a forward edge of the blocking plate 34. The blocking plate 30 can be pivoted in a movement from a non-contact position to a contact position with the control pedals 22 in the motor vehicle 12.

The base plate 30 is generally rectangular and the hinge 36 is attached along a forward longer edge of the base plate 30 on the floor 14 of the motor vehicle 12 in a direction substantially parallel to the plane in which the control pedals 22 are disposed. The blocking plate 34 is generally rectangular and is attached along a forward longer edge to the hinge 36 on the base plate 30 on the floor 14 of the motor vehicle 12 in a direction substantially parallel to the plane in which the control pedals 22 are disposed.

The fasteners 32 are a plurality of bolts 38 to secure the base plate 30 to the floor 14 in the motor vehicle 12. The base plate 30 can be factory welded (fixed) to the floor 14 in the motor vehicle 12 to make it more secure.

The blocking plate 34 contains an arm 40 extending from one shorter edge to the one side of the central console 16 in the motor vehicle 12 and is attached to the linkage mechanism 28. A latch mechanism 42 is between a top surface of the base plate 30 and a bottom surface of the blocking plate 34. When the blocking plate 34 is in its non-contact position the latch mechanism 42 will keep the blocking plate 34 in a stationary condition. The base plate 30 has a length and width approximately that of the blocking plate 34, so that when the blocking plate 34 is in its non-contact position it will generally cover and rest upon the base plate 30.

The linkage mechanism 28 includes a first pulley assembly 44, rotatably mounted within the central console 16 in the motor vehicle 12 adjacent and to one side of the immobilizing bracket 26. A second pulley assembly 46 is rotatably mounted within the central console 16 in the motor vehicle 12 adjacent and below the emergency brake lever 18. A second cable 48 is connected at a first end to a distal end of the arm 40 on the blocking plate 34. The second cable 48 extends about the first pulley assembly 44 to the second pulley assembly 46 and then is connected at a second end to the emergency brake lever 18. When the emergency brake lever 18 is pulled into its engagement position the second cable 48 will lift up the arm 40 with the blocking plate 34, to contact the control pedals and prevent operation of the control pedals 22.

The improved anti-theft device 10 further contains a mechanism 50 for locking the emergency brake lever 18 in its engagement position, so that an unauthorized person cannot release the emergency brake lever 18, thereby preventing access to the control pedals 22 to drive the motor vehicle 12. The locking mechanism 50 includes a numerical code combination lock 52 incorporated within the emergency brake lever 18, so that a secret numerical code can be selected to unlock the emergency brake lever 18.

LIST OF REFERENCE NUMBERS 10 improved anti-theft device
12 motor vehicle
14 floor in 12
16 central console on 14
18 emergency brake lever on 16
20 emergency brake cable for 18
22 control pedals in 12
24 control pedals operation preventing structure for 10
26 immobilizing bracket
28 linkage mechanism
30 base plate
32 fastener on 30
34 blocking plate
36 hinge between 30 and 34
38 bolt for 32
40 arm on 34
42 latch mechanism between 30 and 34
44 first pulley assembly
46 second pulley assembly
48 second cable
50 locking mechanism
52 numerical code combination lock in 50

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved anti-theft device for a motor vehicle having a floor, a central console on the floor, an emergency brake lever on the central console, a cable extending from the emergency brake lever to operate the emergency brake and control pedals above the floor, said device comprising means coupled between the emergency brake lever and the control pedals for preventing operation of the control pedals when the emergency brake lever is pulled into its engagement position to set the emergency brake in the motor vehicle, said control pedals operation preventing means includes an immobilizing bracket on the floor under the control pedals adjacent to one side of the central console in the motor vehicle, and a linkage mechanism connected to one side of said immobilizing bracket and extending within the central console to the emergency brake lever, so that when the emergency brake lever is pulled into its engagement position, said linkage mechanism will cause said immobilizing bracket to contact the control pedals preventing the control pedals from operating.

2. An improved anti-theft device for a motor vehicle as recited in claim 1, wherein said immobilizing bracket includes:
   a) a base plate;
   b) means for fastening said base pate to the floor under the control pedals in the motor vehicle;
   c) a blocking plate; and
   d) a hinge located between a forward edge of said base plate and a forward edge of said blocking plate, so that said blocking plate can be pivoted in a movement from a non-contact position to a contact position with the control pedals in the motor vehicle.

3. An improved anti-theft device for a motor vehicle as recited in claim 2, wherein said base plate is generally rectangular and said hinge is attached along a forward longer edge of said base plate on the floor of the motor vehicle in a direction substantially parallel to the plane in which the control pedals are disposed.

4. An improved anti-theft device for a motor vehicle as recited in claim 3, wherein said blocking plate is generally rectangular and is attached along a forward longer edge to said hinge on said base plate on the floor of the motor vehicle in a direction substantially parallel to the plane in which the control pedals are disposed.

5. An improved anti-theft device for a motor vehicle as recited in claim 4, wherein said fastening means includes a plurality of bolts to secure said base plate to the floor in the motor vehicle.

6. An improved anti-theft device for a motor vehicle as recited in claim 5, wherein said blocking plate includes an arm extending from one shorter edge to the one side of the central console in the motor vehicle and attached to said linkage mechanism.

7. An improved anti-theft device for a motor vehicle as recited in claim 6, further including a latch mechanism between a top surface of said base plate and a bottom surface of said blocking plate, so that when said blocking plate is in its non-contact position said latch mechanism will keep said blocking plate in a stationary condition.

8. An improved anti-theft device for a motor vehicle as recited in claim 7, wherein said base plate has a length and width approximately that of said blocking plate, so that when said blocking plate is in its non-contact position it will generally cover and rest upon said base plate.

9. An improved anti-theft device for a motor vehicle as recited in claim 8, wherein said linkage mechanism includes:
a) a first pulley assembly rotatably mounted within the central console in the motor vehicle adjacent and to one side of said immobilizing bracket;
b) a second pulley assembly rotatably mounted within the central console in the motor vehicle adjacent and below the emergency brake lever; and
c) a second cable connected at a first end to a distal end of said arm on said blocking plate, extending about said first pulley assembly to said second pulley assembly and then connected at a second end to the emergency brake lever is pulled into its engagement position said second cable will lift up said arm with said blocking plate to contact the control pedals and prevent operation of the control pedals.

10. An improved anti-theft device for a motor vehicle as recited in claim 9 further including means for locking the emergency brake lever in its engagement position, so that an unauthorized person cannot release the emergency brake lever, thereby preventing access to the control pedals to drive the motor vehicle.

11. An improved anti-theft device for a motor vehicle as recited in claim 10, wherein said locking means includes a numerical code combination lock incorporated within the emergency brake lever, so that a secret numerical code can be selected to unlock the emergency brake lever.

* * * * *